United States Patent [19]
Yamamoto et al.

[11] Patent Number: 5,766,465
[45] Date of Patent: Jun. 16, 1998

[54] WATER TREATMENT APPARATUS

[75] Inventors: Shinpei Yamamoto; Kazuhiro Takagi; Etutami Kiyotani; Iwane Kagimoto, all of Kochi; Shinichi Kariya, Nangoku; Satoshi Matsumoto, Tokyo, all of Japan

[73] Assignee: Toyo Denka Kogyo Co., Ltd., Kochi, Japan

[21] Appl. No.: 641,712

[22] Filed: May 2, 1996

Related U.S. Application Data

[62] Division of Ser. No. 374,800, Feb. 15, 1995.

[30] Foreign Application Priority Data

| Jun. 16, 1993 | [JP] | Japan | 5-168349 |
| Sep. 3, 1993 | [JP] | Japan | 5-242115 |
| Mar. 16, 1994 | [JP] | Japan | 6-46048 |

[51] Int. Cl.$^6$ .................................................. C02F 9/00
[52] U.S. Cl. ............................ 210/255; 210/266; 210/284
[58] Field of Search .............................. 210/631, 669, 210/150, 151, 259, 266, 283, 284, 255, 262

[56] References Cited

U.S. PATENT DOCUMENTS

| 3,617,540 | 11/1971 | Bishop et al. | 210/631 |
| 4,167,479 | 9/1979 | Besik | 210/631 |
| 4,188,289 | 2/1980 | Besik | 210/631 |
| 4,568,463 | 2/1986 | Klein | 210/150 |

FOREIGN PATENT DOCUMENTS

| 48-91860 | 11/1973 | Japan. |
| 57-140698 | 8/1982 | Japan. |
| 63-175693 | 7/1988 | Japan. |
| 3-254895 | 11/1991 | Japan. |
| 4-322796 | 11/1992 | Japan. |
| 5-50094 | 3/1993 | Japan. |
| 5-219953 | 8/1993 | Japan. |
| 6-122000 | 5/1994 | Japan. |

OTHER PUBLICATIONS

Studies on the Biodegradation of Linear Alkylbenzene Sulfonate (LAS) by Activated Sludge, vol. 5, No. 1, pp. 19–25, 1982, Kochi Yoshimura et al.

Studies on the Biodegradation of Linear Alkylbenzene Sulfonate (LAS) by Activated Sludge, vol. 5, No. 2, pp. 63–72, 1982, Koichi Yoshimura et al.

*Primary Examiner*—Ivars Cintins
*Attorney, Agent, or Firm*—McDermott, Will & Emery

[57] ABSTRACT

The present invention is directed to provide a water treatment technology able to perform advanced purification treatment by efficiently removing synthetic organic compounds such as surface activators for use in cleaners and agricultural chemicals present in polluted water having a relatively low load of pollutants such as BOD. In order to accomplish this objective, water to be treated is brought in contact with a assimilable filter medium under aerobic conditions, said assimilable filter medium being composed by adhering a material to be assimilated that has specific assimilability for the target microorganisms to a porous base material such as charcoal. As a result of using this type of assimilable filter medium, specific microorganisms which are highly efficient for removing the synthetic organic pollutants to be removed can be utilized selectively, thereby enabling efficient removal of synthetic organic compounds.

4 Claims, 5 Drawing Sheets

WATER TREATMENT APPARATUS

This application is a division of Application Ser. No. 08/374,800 filed Feb. 15, 1995.

(TECHNICAL FIELD)

The present invention relates to a water treatment technology, and more particularly, to a water treatment technology suitable for performing advanced purification treatment on waste water having a relatively low pollution load.

(BACKGROUND OF THE INVENTION)

It is widely known that LAS (Linear Alkylbenzene Sulfonates; surface activators used as the major ingredient of synthetic cleaners) can be effectively removed from water by activated sludge processes enabling efficient water treatment of waste water having a relatively high pollution load in the manner of sewer water and industrial waste water (for example, "Water Pollution Research", Vol. 5, No. 1, pp. 19–25 as well as "Research on Biodegradation of Sodium Linear Alkylbenzene Sulfonates (LAS) by Activated Sludge—Parts (I) and (II) of pp. 63–72 of Vol. 5, No. 2 of this same publication, 1982).

However, in the case of treatment of river basin waterways, and particularly rivers into which flow domestic waste water and water contaminated with agricultural chemicals, considered to account for a significant proportion of the route by which synthetic organic compounds such as LAS and agricultural chemicals enter the environment, it is difficult to apply activated sludge processes due to the pollution load being excessively low and the presence of large daily fluctuations in that load.

In addition, although numerous examples of water treatment technology aimed at treatment of water in such rivers and waterways are already known, these known technologies are unable to demonstrate significant effects with respect to removal of LAS. In addition, due to decreased performance caused by clogging of the filter material used, saturation and so forth, all of these technologies have problems that remain to be solved for stable continuation of advanced purification treatment.

Moreover, although there are also numerous reports regarding removal by adsorption of LAS using charcoal and activated carbon, charcoal does not have adsorptivity to effectively carry out removal of LAS, while activated carbon, although having a high level of adsorptivity, suffers problems in terms of saturation and running costs.

To describe in detail, with respect to rivers and waterways which are major discharge routes into the environment for harmful synthetic organic pollutants such as LAS, and for which there is a strong desire to remove these pollutants, there is still no process by which these synthetic organic pollutants can be effectively removed at the practical level.

However, the inventors of the present invention previously developed a charcoal microhabitat able to realize improved efficiency of biological water treatment by using this charcoal microhabitat as a filter material due to its excellent microorganism colonization (Japanese Patent Application No. 4-59177). In addition, the present inventors developed a method differing from conventional processes which only remove nitric acid in water as nitrogen gas using denitriding bacteria, and incorporates a process wherein nitric acid, having a low level of to-be-adsorbed property, is converted to ammonia nitrogen having a high level of to-be-adsorbed property, after which this ammonia nitrogen is removed by adsorption using an adsorbent. Moreover, in this method, a plurality of types of biological treatments can be utilized in combination, and those treatments can be carried out simultaneously. Therefore, this method enables a high degree of denitriding treatment while using a relatively simple equipment structure (Japanese Patent Application No. 4-296553). However, since all these technologies are relatively new, the development of a water treatment system that makes effective use of these technologies to comprehensively perform advanced water treatment remains to be a subject for a future study. Therefore, the inventors of the present invention proceeded with the development of a new water treatment system that uses the above-mentioned technologies, thereby obtaining the water treatment apparatus to be described later.

After first confirming that this water treatment apparatus is able to adequately achieve the intended treatment level by conducting model experiments, an experimental apparatus was installed in an actual river, and test was carried out by collecting performance data and so forth to confirm the performance of said apparatus on an actual scale.

When analyses were performed on LAS in view of the above-mentioned problems during this test, a high concentration of LAS of about 0.4 mg/liter in the inflow was lowered to about 0.04 mg/liter in the final discharge water. It was thus found that the new system demonstrates extremely effective LAS removal performance.

When an additional analysis was conducted to determine which tank in the water treatment apparatus to be described later is functioning for removal of LAS, it was found that the chitosan charcoal tank was functioning the greatest. Moreover, when the mechanism by which the chitosan charcoal tank functions to effectively remove LAS was analyzed, the following mechanism was surmised.

Namely, as is also found in the above-mentioned references, removal of LAS is carried out by adsorption and biodegradation by microorganisms in activated sludge processes, and the mechanism of this adsorption and biodegradation also functions in the chitosan charcoal tank. With respect to this adsorption and biodegradation, in addition to the characteristic of chitosan charcoal demonstrating excellent bacterial colonization, since bacteria are also able to utilize the chitosan adhered in its pores as a supplementary source of nutrition, namely as a material to be assimilated, it is possible to make effective use of co-metabolism (a phenomenon wherein biodegradation of synthetic organic compounds like LAS and agricultural chemicals becomes first possible or is promoted in the presence of an energy source and a nutrient source which serves as a material for synthesis of the microorganism), it also has the characteristic of bacterial activity being stable even during quantitative fluctuations in the organic pollution load which serves as the nutrient source. Moreover, due to its highly hydrophobic nature, chitosan can be expected to demonstrate a high degree of adsorption resulting from hydrophobic adsorption. In addition, together with providing an adequate amount of oxygen by aerating the inside of the chitosan charcoal tank, by creating a forced state of convection in the water to be treated, efficient contact is achieved between the chitosan charcoal and water to be treated, thereby increasing the number of opportunities for adsorption. Contrivances such as those matters act synergistically, thereby resulting in an efficient removal of LAS.

In addition, as a result of carrying out an analysis of the microorganisms that actually function to remove LAS, the following facts became clear. To begin with, although colonization of bacteria is observed at a high density in chitosan charcoal, there are basically only two types of bacteria involved. It is therefore clear that chitosan charcoal has a selective colonization function that is extremely specific for the type of microorganism. In other words, specific microorganisms are selectively colonized according to the combination of two conditions consisting of the material to be assimilated in the form of chitosan, and the size of the pores of the charcoal base material which serve as pores for habitation by microorganisms. It was therefore actually proven that specific pollution components (LAS in this case) are able to be efficiently treated by these selectively colonized microorganisms. In addition, when these microorganisms were identified by standard identification methods, the two types of bacteria were both found to be known genus that are easy to acquire, namely bacteria of the Pseudomonas genus. One was identified as Pseudomonas fluorescens biover 5, and the other as Pseudomonas putida biover A.

(DISCLOSURE OF THE INVENTION)

Based on the above-mentioned findings, the present invention efficiently removes synthetic organic compounds by effectively utilizing the properties like those mentioned above possessed by a assimilable filter medium exemplified by chitosan charcoal formed by adhering chitosan to charcoal, namely a assimilable filter medium composed by adhering the material to be assimilated, having specific assimilability with respect to the target microorganism, to the pore walls of pores possessed by a porous base material with respect to at least the range of depth required for the microorganisms to inhabit said pores. More specifically, the present invention is carried out by selectively adhering the Pseudomonas genus of Pseudomonas fluorescens biover 5 and Pseudomonas putida biover A to a assimilable filter medium such as chitosan charcoal, and enabling the specific bacteria selectively adhered to the assimilable filter medium to remove specific pollution components by biodegradation as in the example of removal of LAS by two types of bacteria. In order to accomplish this, the assimilable filter medium is aerated to enable contact with the water to be treated while maintaining aerobic conditions, and a forced convection state is produced in the water to be treated during contact with the assimilable filter medium.

Although the functions of the material to be assimilated, such as chitosan, which is formed into the assimilable filter medium used in the present invention, include covering the spinal structure of the surface of the pore walls of the base material to an extent which does not have an adverse effect on the microorganisms, eliminating the polarity of the pore walls, and forming a supplementary nutrient source for the microorganisms adhered in the pores, the required amount is considered to be satisfied if to an extent which at least enables the spinal structure of the pore wall surfaces to be covered.

While there are various possible techniques for adhering the material to be assimilated to the pore walls of the base material, an example of one of the most reliable methods involves, in the case of chitosan, immersing the base material in a chitosan solution for a fixed period of time. An example of a simpler method involves spraying and/or atomizing the chitosan solution onto the base material. In this case, although uniform adherence of chitosan to the deeper portions of the pores may not always be possible, this is still sufficient for colonization of the microorganisms. In other words, if the chitosan is colonized in the manner described above with respect to the range over which the microorganisms are able to inhabit the pores, the necessary conditions can be satisfied.

With respect to the previously mentioned mechanism that functions in the present invention, it is an actually ascertained fact that a assimilable filter medium consisting of chitosan processed charcoal demonstrates favorable properties, and it is only natural from the principle deduced from this fact that a material having a porous structure similar to charcoal, such as porous minerals or sponge-like materials, would function in the same manner when used as a base material following processing with chitosan. In addition, with respect to the material to be assimilated that is adhered to the base material, although a polysaccharide exemplified by chitosan is particularly preferable, other materials can also be used provided they satisfy the above-mentioned requirements, namely having specificity to certain microorganisms, having the properties that allow it to function as a supplementary nutrient source for the purpose of the action of co-metabolism and so forth as described above, and being hydrophobic and so forth. Moreover, in addition to colonization specificity according to the type of material to be assimilated, since the shape and size of the pores in the porous base material can also be made to contribute to colonization specificity, selective colonization of microorganisms can be further improved by suitably selecting the combination of the type of material to be assimilated and the type of base material. Thus, with respect to the pollutant of the water to be treated as well, a similar removal mechanism is considered to be able to be effectively demonstrated with respect to not only LAS, but also synthetic organic compounds similar to LAS such as the components of agricultural chemicals, by selectively colonizing specific microorganisms that are able to efficiently decompose those compounds.

Although this type of water treatment apparatus effectively removes LAS and other synthetic organic compounds using the mechanism described above based on the properties of a assimilable filter medium like chitosan charcoal, it also has the characteristics like those indicated below. Namely, in comparison with systems that remove LAS and so forth by adsorption alone using, for example, activated charcoal following ordinary treatment, since this apparatus is able to effectively utilize biodegradation, there are few problems with saturation and maintenance is easy. In addition, since the process is carried out in combination with treatment of BOD components and so forth, the system can be simplified thus enabling reduction of costs.

The present invention also provides a water treatment apparatus equipped with a pre-treatment tank filled with a filter for removal of suspended solids and so forth, a denitriding tank provided with a assimilation layer filled with a material to be assimilated by bacteria and an adsorbent layer filled with an adsorbent able to adsorb ammonia nitrogen continuous with the assimilation layer, a chitosan charcoal tank filled with chitosan charcoal, a dephosphorization tank filled with an adsorbent able to adsorb phosphorous, and a finishing tank filled with charcoal. As a result, the present invention is able to function as a water treatment apparatus able to efficiently remove synthetic organic compounds like those mentioned above as well as perform advanced treatment of BOD components and so forth.

The major treatment functions of each tank in this water treatment apparatus are as described below. In addition to these major forms of treatment, the apparatus also has concomitant treatment functions corresponding to the type of filter medium concomitantly filled into each tank. Each of these treatments is a biological treatment, and these major treatments and concomitant treatments are combined to realize advanced treatment.

Removal of suspended solids (SS) and degradation of BOD components (organic substances) are performed in the pre-treatment tank.

In the denitriding tank, nitric acid is removed by converting to ammonia nitrogen and nitrogen gas (N2) by three types of processes under highly an aerobic conditions provided by a assimilation layer. More specifically, as a result of immersing the material to be assimilated in water and consuming oxygen by temporary growth of aerobic bacteria through utilization of this material to be assimilated, highly anaerobic conditions are formed in the assimilation layer. Conversion to ammonia nitrogen then proceeds by reduction based on the biological activity of bacteria having the ability to reduce nitric acid which were grown under anaerobic conditions in the assimilation layer by utilizing the material to be assimilated, and purely chemical reduction due to the highly oxygen-free conditions, namely the high reduction level, in the assimilation layer. These reduction steps are indicated as $NO_3^- \rightarrow NO_2^- \rightarrow N_2O \rightarrow NH_4^-$. On the other conversion to nitrogen gas ($N_2$) is similarly performed by denitrifying bacteria grown under anaerobic conditions in the assimilation layer by using the material to be assimilated, and is indicated in the form of $NO_3^- + 5H$ (hydrogen donor) $\rightarrow 0.5\ N_2 + 2H_2O + OH^-$. As described above, simultaneous to the ammonia nitrogen formed in the assimilation layer moving to the adsorbent layer by riding the flow of water, which has a reduced amount of dissolved oxygen, by passing through the assimilation layer, it is adsorbed by the adsorbent of the adsorbent layer without redissolving. On the other hand, the nitrogen gas is released into the atmosphere.

In the chitosan charcoal tank, degradation of BOD components and removal of synthetic organic compounds such as the above-mentioned LAS are performed. In the dephosphorization tank, dephosphorization is performed by adsorption using an adsorbent, and in the finishing tank, removal of the final SS and degradation of BOD components are performed together with decolorization and deodorization.

Although various combinations are possible for the arrangement sequence of each of the tanks in the above-mentioned water treatment apparatus, a preferable example of this arrangement sequence consists of the pre-treatment tank, denitrification tank, chitosan charcoal tank, special aeration tank, dephosphorization tank and finishing tank in view of the relation between the respective processes, moving in order from the upstream side to the downstream side.

In addition, since the dephosphorization process in the above-mentioned water treatment apparatus has a relatively low level of correlation with the other treatment processes while also having a high degree of freedom with respect to the order of treatment, this process can be provided by combining the adsorbent for dephosphorization with the filler of another tank. In the case of integrating the dephosphorization tank with another tank in this manner, it is structurally easily to combine it with the chitosan charcoal tank in particular, and is desirable in terms of improving overall treatment efficiency.

In addition, if, with respect to the above-mentioned water treatment apparatus, any of the tanks is provided as a pair, and a common sludge pit is provided for both of these tanks so that water to be treated entering from the top of one of the tanks flows in from the bottom via the sludge pit, forced downward flow and upward flow can be produced in both tanks. This is preferable since the contact efficiency of the water to be treated with the filler can be improved.

In addition, in the case of producing a downward flow and upward flow in this manner, it is more preferable to form a dividing wall that separates the pair of tanks so that it protrudes high enough with respect to the normal water level, and the water level of the tank on the upward flow side is higher than the water level of the tank on the downward flow side when the flow of water through the filler in the tanks has decreased. Namely, since the downward flow pressure and upward flow pressure can be increased according to the difference in water levels between the two sides, these increases in pressure are allowed to oppose the flow resistance caused by the sludge (biomembrane and adhered substances) retained in the surface and gaps of the filler. As a result, decreases in water flow can be prevented and moreover, sludge can be suitably separated and removed by this high-pressure water flow. Consequently, this makes it possible to eliminate the need for periodic sludge removal work by back washing and so forth.

(BEST MODE FOR CARRYING OUT THE INVENTION)

The following provides an explanation of an embodiment of the present invention.

Figure 1:
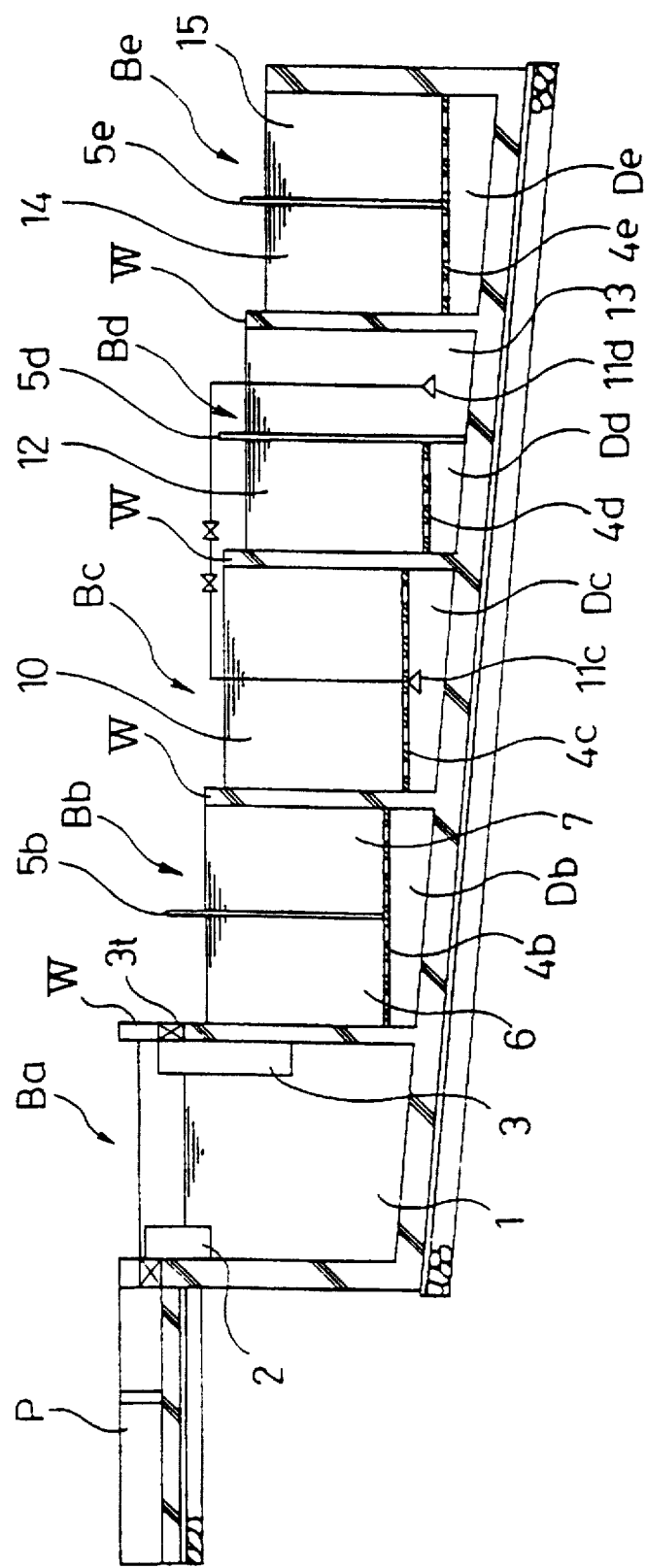
FIG. 1 is a cross-sectional view of a water treatment apparatus according to a first embodiment of the present invention.
Figure 2:
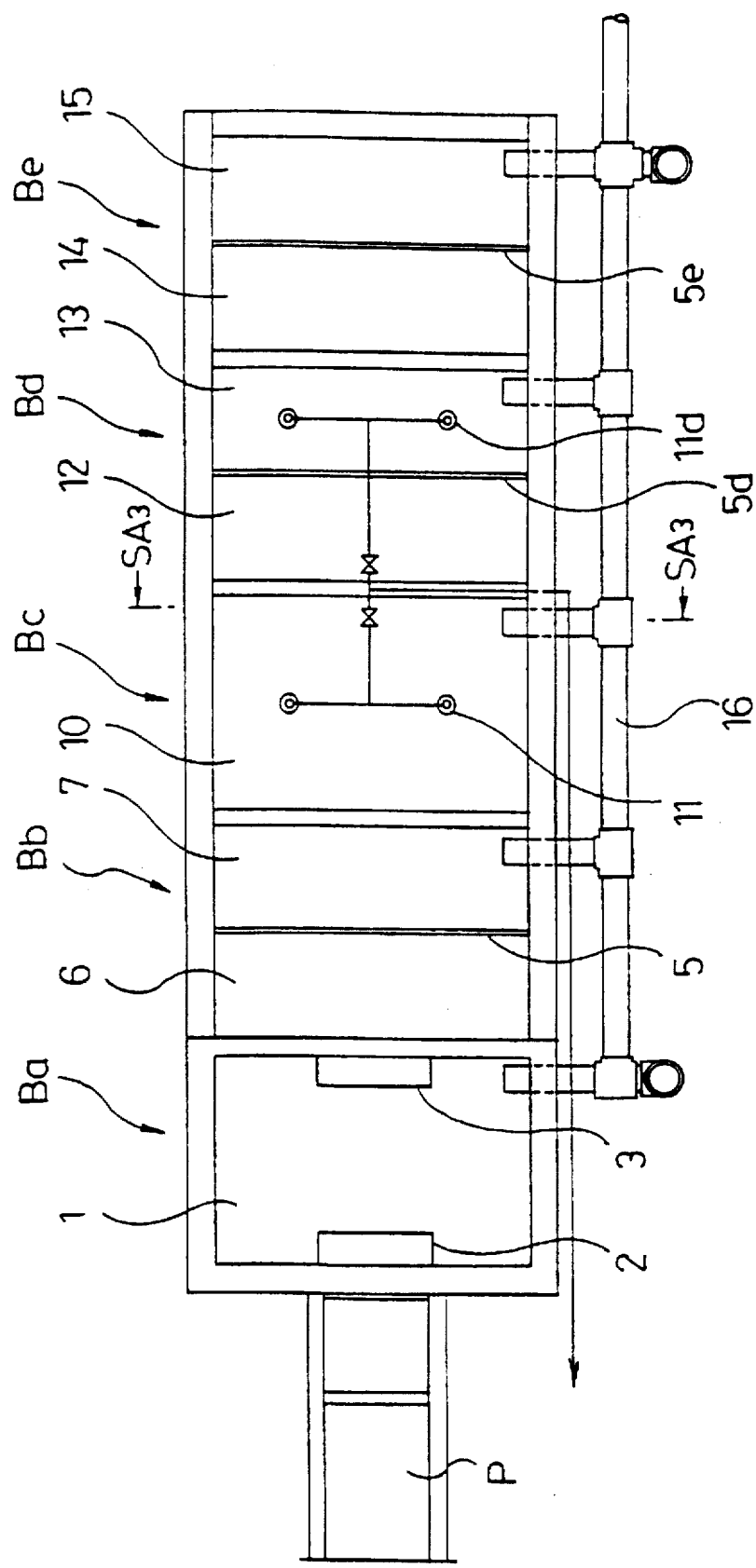
FIG. 2 is a plan view of the water treatment apparatus shown in FIG. 1.
Figure 3:
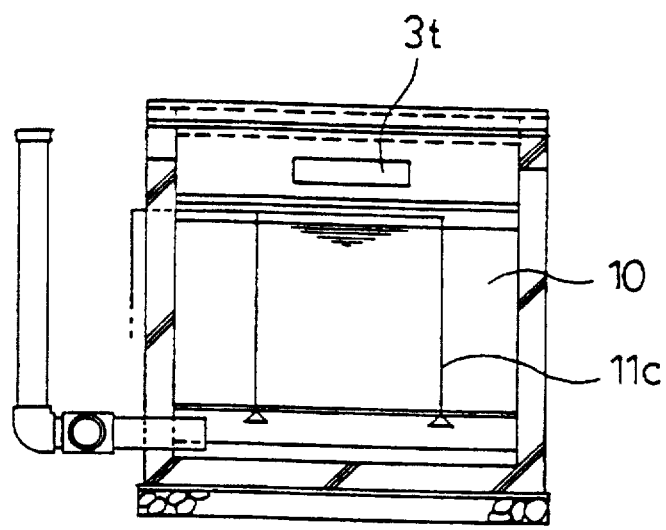
FIG. 3 is a cross-sectional view taken along the line $SA_3$—$SA_3$ indicated by an arrow in FIG. 2.

The example of the water treatment apparatus in the present embodiment was designed to have an average treatment capacity of about 50 m³/day. As shown in FIGS. 1 through 3, the inside of a casing formed of concrete into the shape of a rectangular parallelopiped having a total length of about 11 m, width of about 3.5 m and height of about 2.2 m is divided nearly equally into five first through fifth blocks Ba–Be with main dividing walls W. The structure is such that the required tank is then set for each of blocks Ba–Be.

The entire first block Ba is in the form of sedimentation tank 1. This sedimentation tank 1 is for removing relatively large suspended objects by sedimentation from the water to be treated, and has an inflow regulating cylinder 2 on its upstream end, an outflow regulating cylinder 3 on its downstream end, and the remainder is empty. In other words, water to be treated that flows in from an inflow path P to this sedimentation tank 1 flows downward from the inflow regulating cylinder 2 and flows in towards the bottom of sedimentation tank 1. After gently moving through the inside of the tank, the water to be treated flows out from the outlet 3t of outflow regulating cylinder 3 to a second block Bb. The retention time of the water to be treated in the sedimentation tank 1 during this time is about 4 hours, and during this retention, relatively large suspended objects are removed by sedimentation.

In the second block Bb, together with providing a holed bottom plate 4b suspended from the bottom of the casing so that sludge pit Db is formed to have a prescribed depth, a pre-treatment tank 6 and a denitriding tank 7 are formed by dividing with a dividing plate 5b provided upright in the center of this holed bottom plate 4b. Thus, both tanks 6 and 7 are connected through the sludge pit Db, and the water to be treated flows into the denitrification tank 7 in the form of an upward flow after flowing downward through the pretreatment tank 6 and passing through the sludge pit Db.

Figure 4:
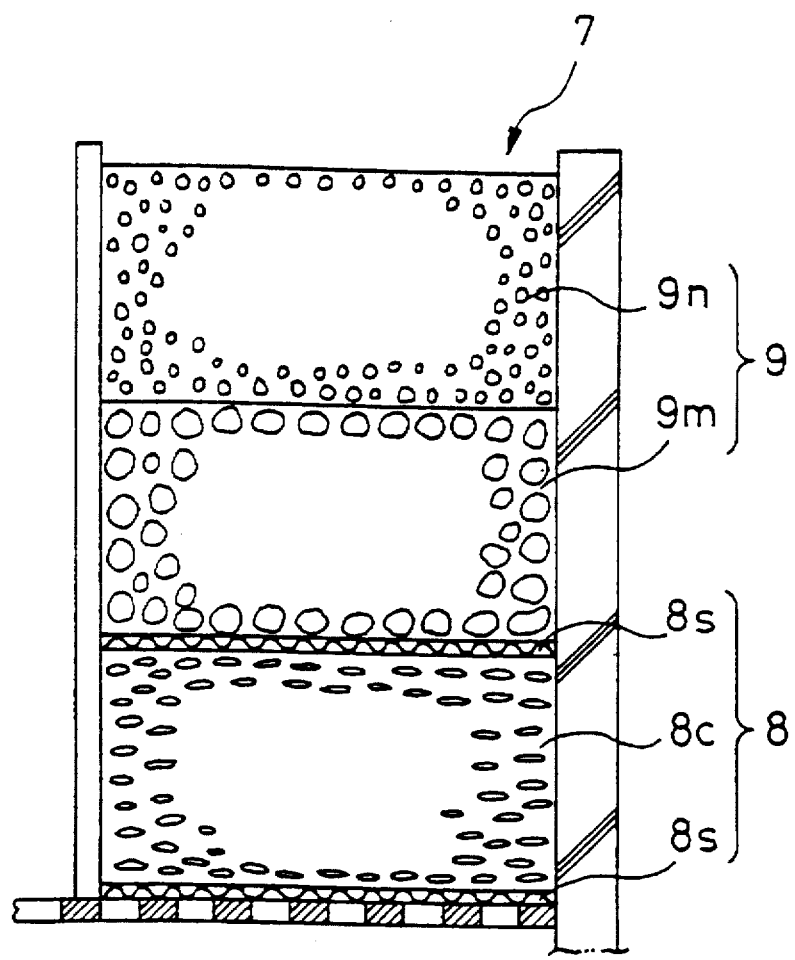
FIG. 4 is a cross-sectional view of the denitrification tank.

Pre-treatment tank 6 is filled with a plastic porous filter medium (not shown). Together with filtering SS by this filter medium, BOD components are removed by degradation by microorganisms adhered to this filter medium. The denitrification tank 7 is for removing nitrogen dissolved in the nitric acid form in the water to be treated. As shown in FIG. 4, said denitriding tank 7 is provided with a assimilation layer 8 and an adsorbent layer 9 in laminated form.

The assimilation layer 8 is formed by filling with dead plant matter which, together which serving as a nutrient source for the bacteria, also provides a suitable habitat for the bacteria. This dead plant matter is filled to a density which yields suitable flow of water. More specifically, said assimilation layer is formed by filling the cores of old straw mat, withered branches, or waste stems of mushrooms and so forth in the form of core layer 8c between surface layers 8s consisting of, for example, forming straw into a matting structure. The dead plant matter of core layer 8c is crushed to a suitable size. This assimilation layer 8 is made to be highly anaerobic by immersing in the water to be treated as previously described. Conversion of the nitric acid into ammonia nitrogen and nitrogen gas is performed by the three types of processes used in combination as described above under these anaerobic conditions. The ammonia nitrogen is removed by adsorption with the adsorbent layer 9, and the nitrogen gas is released into the atmosphere.

The adsorbent layer 9 is formed by filling with an adsorbent having a high adsorption capacity for ammonia nitrogen, for example, mineral substances such as zeolite or vermugulite, formed into pebbles. The adsorbent layer 9 has a double-layer structure consisting of a layer 9m, a large-sized adsorbent, and a layer 9n, a small-sized adsorbent.

The third block Bc is in the form of a first chitosan charcoal tank 10 for removing BOD components by degradation entirely using aerobic biological treatment. A holed bottom plate 4c for forming a sludge pit Dc is also provided in its bottom. Fragments of chitosan charcoal (not shown), which have been treated with chitosan, are layered on top of this holed bottom plate 4c. Moreover, aeration is performed in this chitosan charcoal tank by an aeration device 11c to an extent which produces an agitating state of forced convection in the water to be treated in the tank. Incidentally, since chitosan charcoal floats easily in water, an adsorbent for adsorption of ammonia nitrogen is placed on top as a weight.

The chitosan charcoal used in this water treatment apparatus is obtained by the process described below.

Mixed charcoal having a deciduous tree to coniferous tree ratio of 8:2 and crushed into pieces having a size of 5 to 10 mm was used for the raw material charcoal.

Chitosan in the form of a pale yellowish-white powder having a degree of deacetylation of at least 70% (Koyo Chitosan SK-400 (trade name), Koyo Chemical Co., Ltd.) was used as the chitosan.

Adherence was performed using the immersion method under the conditions described below.

Chitosan solution: Prepared by dissolving 1% of chitosan in 5% aqueous acetic acid.

immersion conditions: Normal temperature, normal pressure

Immersion time: 24 hours

Drying conditions: 8 to 16 hours at 50°–60° C.

A comparative test was conducted with respect to the adsorptivity of this chitosan charcoal relative to LAS between ordinary charcoal (oak charcoal, red pine charcoal) and activated carbon. As a result, the respective relationships of adsorptivity were activated carbon>chitosan charcoal>red pine charcoal>oak charcoal for LAS10 and LAS11, and activated carbon >chitosan charcoal>oak charcoal>red pine charcoal for LAS12 to LAS14. In addition, although the respective differences in adsorptivity were larger for LAS10 to LAS12 which is present in relatively large amounts, the adsorptivity of chitosan charcoal was typically several times greater than ordinary charcoal in particular. Thus, although chitosan charcoal itself has excellent adsorptivity with respect to LAS, it is believed to realize excellent LAS removal performance as a result of this property combining with the various other properties of chitosan charcoal described above as well as conditions of aeration which produce a state of forced convection.

The fourth block Bd is divided nearly equally by dividing plate 5d provided upright from the bottom of the casing. The upstream side consists of a second chitosan charcoal tank 12, while the downstream side consists of a special aeration tank 13. The second chitosan charcoal tank 12 is basically the same as the above-mentioned first chitosan charcoal tank 10 with the exception of being roughly half its size. On the other hand, the special aeration tank 13 is for supplying oxygen to the water to be treated. It is empty in the same manner as sedimentation tank 1 to facilitate the dispersion of air supplied with an air supply device lid in the water being treated.

The fifth block Be is provided with a dephosphorization tank 14 and a finishing tank 15 and employs the same structure as the second block Bb. The dephosphorization tank 14 is provided primarily for the purpose of removing phosphorous by adsorption, and is also for supplementarily removing ammonia nitrogen by adsorption. The dephosphorization tank 14 is filled with an adsorbent (not shown) for adsorption of phosphorus and an adsorbent (not shown) for adsorption of ammonia nitrogen layered in laminated form. On the other hand, the finishing tank 15 is filled with ordinary charcoal (not shown). Together with this tank performing decolorization and deodorization using this charcoal, it also performs filtration of fine SS as well as final biological treatment.

Each of the dividing plates 5b, 5d and 5e in the second block Bb, fourth block Bd and fifth block Be, is formed to protrude high enough above the normal water level (as shown in FIG. 1). This is done for the purpose of allowing the water level on the upstream side of the tank to be higher than the water level on the downstream side of the tank corresponding to increases in flow resistance that occur due to accumulation of sludge on the filter medium and chitosan charcoal in each tank. As a result, this serves to prevent decreases in water flow as well as maintain constant back washing effects.

Incidentally, as shown in FIG. 2, a sludge recovery pipe 16 is provided along the casing, thereby enabling recovery of sludge to be performed as necessary from this sludge recovery pipe 16 by means of branching pipes facing each block. In addition, although omitted in the drawings, each block is covered with a lid so that covers the entire block is free from rain and irradiation of sunlight.

Figure 5:
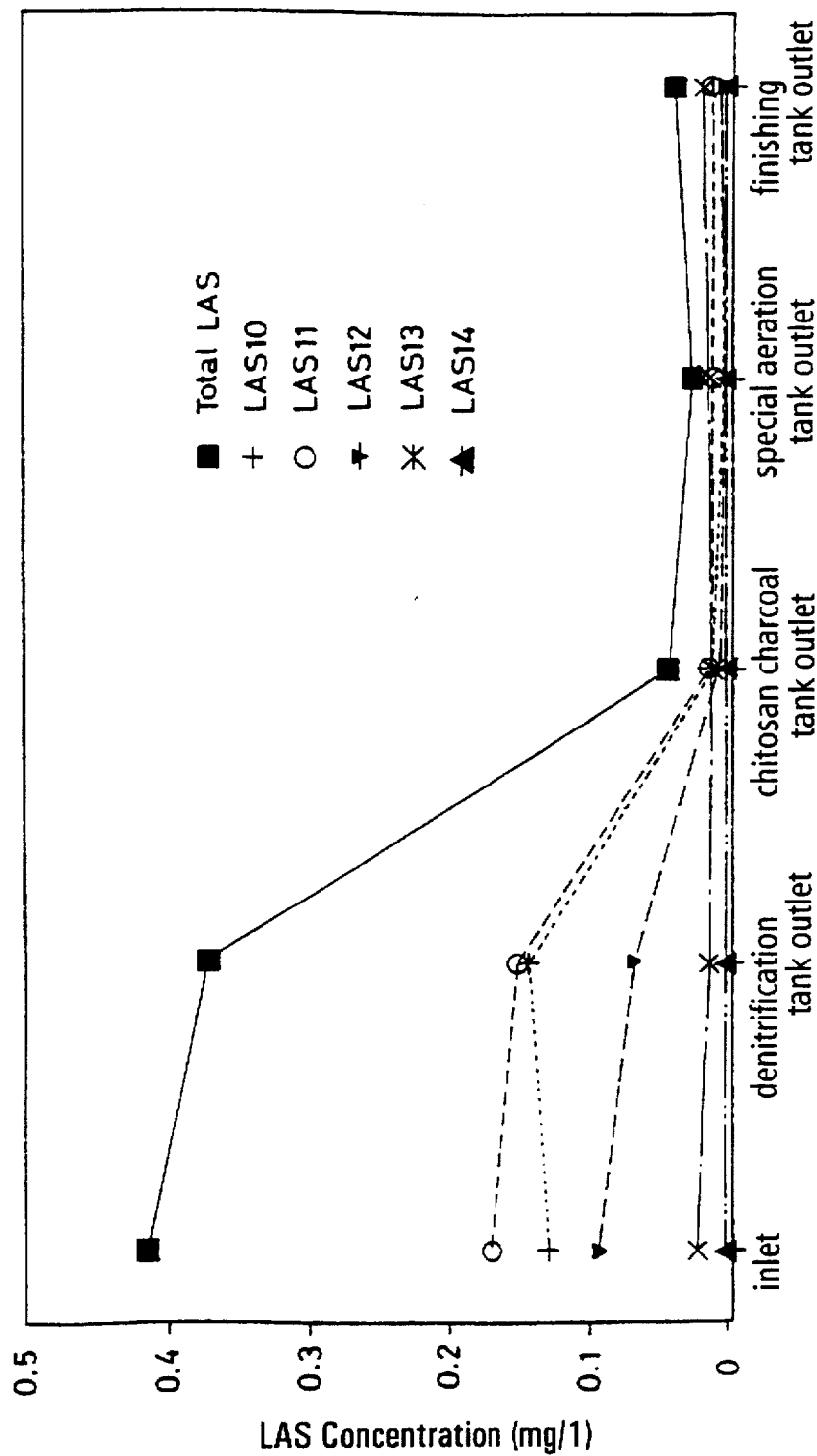
FIG. 5 is a graph showing data on LAS in the water treatment apparatus according to the embodiment of the present invention.

Data pertaining to LAS in the above-mentioned compound water treatment apparatus is shown in FIG. 5. As can be seen from this graph, large fluctuations in the amount of LAS can be seen in the first chitosan charcoal tank 10, thereby indicating the outstanding LAS removal performance of said first chitosan charcoal tank 10. Although a considerable amount of biological treatment occurs in the pre-treatment tank 6 and the finishing tank 15 in particular, the superiority of the LAS removal performance in the chitosan charcoal tank can be clearly understood by comparing with the changes in the amount of LAS in these tanks.

(Industrial Applicability)

As has been described above, since the present invention selectively utilizes specific microorganisms by effectively utilizing the properties of a assimilable filter medium, it is able to greatly contribute to the preservation of water quality in waterways by efficiently removing synthetic organic compounds such as LAS from rivers such as those having a relatively low pollution load.

In addition, as a result of integrally combining a pre-treatment tank, dephosphorization tank and finishing tank and so forth with a denitriding tank and chitosan charcoal tank, having high levels of treatment efficiency which function as the core of the apparatus, the water treatment apparatus of the present invention is able to efficiently perform advanced water treatment that combines denitrification and dephosphorization using entirely biological treatment. Thus, it is able to greatly contribute to the preservation of the water environment in a state that is in harmony with nature by using a purification treatment on waterways, rivers and streams in which, for example, domestic waste water is discharged in the untreated state.

We claim:

1. A water treatment apparatus comprising:
   a pre-treatment tank filled with a filter medium for removal of suspended solids;
   a denitrifying tank provided with an assimilation layer filled with a material to be assimilated by bacteria, and an adsorbent layer filled with an adsorbent for absorbing ammonia nitrogen at the same time as the assimilation layer;
   a chitosan charcoal tank filled with charcoal treated with chitosan;
   a dephosphorization tank filled with an adsorbent for absorbing phosphorous; and
   a finishing tank filled with charcoal.

2. The water treatment apparatus according to claim 1, wherein the tanks are placed from an upstream side to a downstream side in the following order: the pre-treatment tank, the denitrifying tank, the chitosan charcoal tank, the dephosphorization tank and the finishing tank.

3. The water treatment apparatus according to claim 2, wherein water to be treated entering from a top of one of the tanks flows into the bottom of one of the other tanks via a common sludge pit.

4. The water treatment apparatus according to claim 3, wherein a dividing plate divides a pair of tanks and is formed to protrude at least as high as the water level of the upstream side tank, the water level of the tank on the upstream side is higher than the water level of the tank on the downstream side when the flow of water through the filled material in the tanks has decreased.

* * * * *